US006757231B2

United States Patent
Fujiwara (10) Patent No.: US 6,757,231 B2
(45) Date of Patent: Jun. 29, 2004

(54) METHODS FOR IDENTIFYING ERRONEOUS DETECTION OF PRE-PIT SYNCHRONIZATION BIT ON OPTICAL DISC AND IDENTIFYING STABILITY/INSTABILITY OF PRE-PIT SYNCHRONIZATION BIT DETECTION, AND ELECTRIC CIRCUITS THEREFOR

(75) Inventor: Kazunobu Fujiwara, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 613 days.

(21) Appl. No.: 09/783,905

(22) Filed: Feb. 15, 2001

(65) Prior Publication Data

US 2001/0024412 A1 Sep. 27, 2001

(30) Foreign Application Priority Data

Feb. 24, 2000 (JP) ........................................ 2000-046965

(51) Int. Cl.[7] ................................................ G11B 5/09
(52) U.S. Cl. ................................ 369/53.35; 369/59.23; 369/124.07; 375/368; 360/51
(58) Field of Search ............................ 369/53.12, 53.34, 369/53.35, 53.15, 53.16, 47.14, 47.27, 47.31, 59.19, 59.23, 124.07, 124.08; 360/51, 53; 375/365, 368; 714/805

(56) References Cited

U.S. PATENT DOCUMENTS

| 4,353,130 A | * | 10/1982 | Carasso et al. ........... 369/59.23 |
| 4,982,110 A | * | 1/1991 | Yokogawa et al. ........ 369/47.21 |
| 5,621,743 A | * | 4/1997 | Tomisawa .................... 714/746 |
| 5,777,999 A | * | 7/1998 | Hiraki et al. ................ 370/509 |
| 5,856,986 A | * | 1/1999 | Sobey ......................... 714/744 |
| 6,137,756 A | * | 10/2000 | Yoshida et al. ........... 369/53.36 |
| 6,173,430 B1 | * | 1/2001 | Massoudi ................. 369/53.35 |
| 6,181,497 B1 | * | 1/2001 | Malone, Sr. ................. 360/51 |
| 6,181,660 B1 | * | 1/2001 | Hirayama et al. ........ 369/59.23 |

* cited by examiner

Primary Examiner—Thang V. Tran
(74) Attorney, Agent, or Firm—Pillsbury Winthrop LLP (57) ABSTRACT

For each sync frame, an AND circuit detects whether a pre-pit synchronization signal can be obtained within a window set by a timing generator. Detection result of the AND circuit is held by a shift register, where it is shifted in response to each sync frame. On the basis of a parallel output from the shift register, a decoder determines whether the detection of the pre-pit synchronization signal is accurate or erroneous. Count value of a counter is incremented by one each time the decoder determines that the detection of the pre-pit synchronization signal is accurate, but is decremented by one each time the decoder determines that the detection of the pre-pit synchronization signal is erroneous. Identification section identifies stability/instability of the pre-pit synchronization signal detection.

7 Claims, 4 Drawing Sheets

METHODS FOR IDENTIFYING ERRONEOUS DETECTION OF PRE-PIT SYNCHRONIZATION BIT ON OPTICAL DISC AND IDENTIFYING STABILITY/INSTABILITY OF PRE-PIT SYNCHRONIZATION BIT DETECTION, AND ELECTRIC CIRCUITS THEREFOR

BACKGROUND OF THE INVENTION

The present invention relates to a method for identifying erroneous detection of a pre-pit synchronization bit at the time of detecting pre-pits from readout signals of an optical disc (disk) having the pre-pits formed therein in a given signal format and a method for identifying stability/instability of pre-pit synchronization bit detection by use of the identified result of the erroneous detection identifying method, as well as electric circuits for implementing these methods. In particular, the present invention concerns a technique for identifying the erroneous detection of a pre-pit synchronization bit and identifying the stability/instability of pre-pit synchronization bit detection with high accuracy.

Recordable optical discs, such as recordable CDs like CD-R and CD-RW discs and recordable DVDs like DVD-R, DVD+RW, DVD-RAM and DVD-RW, have recording tracks wobbling in predetermined cycles. Generally, during recording, a wobble signal is extracted out of a push-pull signal generated by receiving a reflection of a recording laser light beam off the optical discspecifically, the push-pull signal is indicative of a difference between outputs from light-receiving elements positioned symmetrically about the longitudinal axis of the recording track. Spindle motor control, reproduction of address information, generation of reference clock pulses for a recording signal, etc. are performed on the basis of the extracted wobble signal. Where the optical disc has pre-pits, i.e. marks previously formed intermittently along the recording track in a laterally displaced relation to the centerline of the track, pre-pit signals (i.e., signals indicative of detected pre-pits) are extracted out of the push-pull signal, and the generation of reference clock pulses for a recording signal, reproduction of address information, spindle motor control, etc. are performed on the basis of the extracted pre-pit signals.

Figure 2:
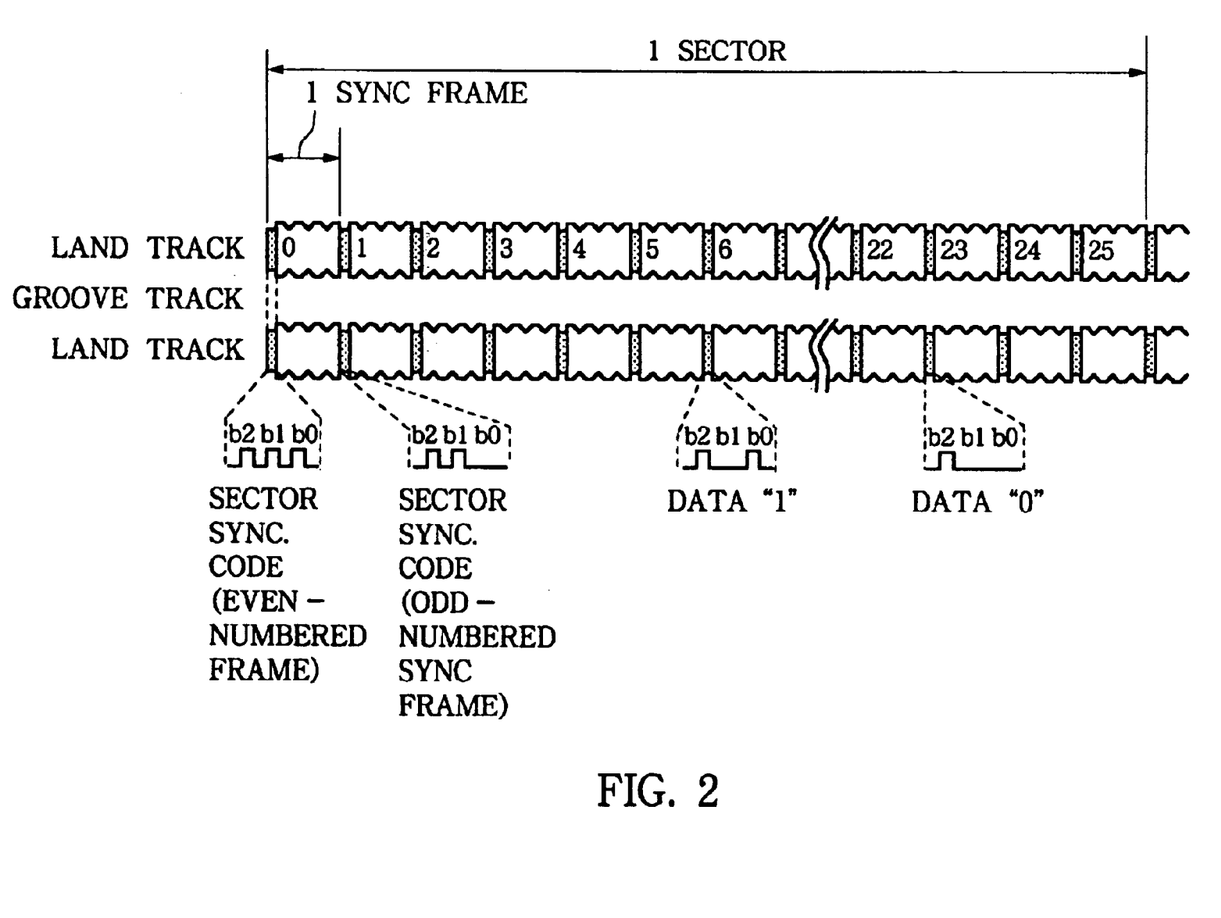
FIG. 2 is a diagram showing a pre-pit signal format of a DVD-R disc.

Examples of the known pre-pit signal formats include one in which synchronization bits are placed at predetermined locations in every other one of a plurality of track-constituting unit sections arranged in the longitudinal direction of the track, and in which in each regions of the track where the synchronization bit substantially overlaps with the synchronization bit of an adjacent track in a radial direction of the optical disc, the recorded location of the synchronization bit is displaced by one track-constituting unit section in the longitudinal direction of the track. As a good example of such a pre-pit signal format, the pre-pit signal format of a DVD-R disc is explained below with reference to FIG. 2. As shown, the recording track (groove track) of the DVD-R disc wobbles at a predetermined frequency 140 kHz, and each length equal to eight waves of the wobbling recording track is set as a track-constituting unit section (sync frame) for recording information. 26 such sync frames constitute a sector and 16 sectors constitute an ECC block, so that information is recorded onto the optical disc ECC block by ECC block. The 26 sync frames constituting a sector consist of even-numbered frames (frame 0, frame 2, ..., frame 24) and odd-numbered frames (frame 1, frame 3, ..., frame 25). In a land track adjacent to the outer edge of the groove track, there are formed land pre-pits in such a manner that the land pre-pits occur once for every two sync frames in correspondence with the groove track. The land pre-pits are normally recorded in the even-numbered sync frames; however, in each region where the land pre-pits in the outer land track substantially overlap radially with similar land pre-pits in another land track adjacent to the inner edge of the groove track, the land pre-pits of the outer land track are formed in the odd-numbered sync frame immediately following the even-numbered sync frame in question (i.e., at a location displaced by one sync frame in the longitudinal direction of the track). so as to avoid undesired interference between the radially overlapping land pre-pits of the inner and outer land tracks (i.e., between radially adjoining land tracks). Each set of the land pre-pits thus formed on the land track consists of a total three bits (i.e., "b2", "b1" and "b0" bits in the head-to-rear direction), each formed at one of predetermined phase angle locations of the leading wobble wave within the sync frame. In TABLE 1 below, there are shown pre-pit codes constituted by various combinations of logical values at the "b2", "b1" and "b0" bits and pre-pit information represented by the pre-pit codes. Note that a logical value "1" of the bit indicates that a land pre-pit is formed at the corresponding location on the disc while a logical value "0" of the bit indicates that no land pre-pit is formed at the corresponding location on the disc.

TABLE 1

| Information | b2 | b1 | b0 |
|---|---|---|---|
| sector sync. code (location in even-numbered frame) | 1 | 1 | 1 |
| sector sync. code (location in odd-numbered frame) | 1 | 1 | 0 |
| data "1" | 1 | 0 | 1 |
| data "0" | 1 | 0 | 0 |

The leading "b2" bit in the pre-pit code is a synchronization signal of the corresponding sync frame, which is invariably present at the head of each sync frame having pre-pits formed therein. The "b1" bit is a signal indicating whether the corresponding pre-pit information is a sector synchronization code or data (information such as position information), and this b1 bit takes the value "1" if the corresponding pre-pit information is a sector synchronization code but takes the value "0" if the corresponding pre-pit information is data. Further, in the case of the sector synchronization code, the "b0" bit is a bit signal indicating whether the recorded location of the pre-pits is in an even-numbered sync frame or in an odd-numbered sync frame. In the case of the data, the "b0" bit represents contents of the data, i.e. data of one bit constituting information such as position information. Where the sector synchronization code is recorded in an even-numbered sync frame, it is formed in the leading (i.e., 0th) sync frame of the sector, while the sector synchronization code is recorded in an odd-numbered sync frame, it is formed in the second-from-head (i.e., 1st) sync frame of the sector. Namely, in every sector on the track of the optical discsuch a sector synchronization code is formed in either the leading (0th) sync frame or the second-from-head (i.e., 1st) sync frame.

Figure 3:
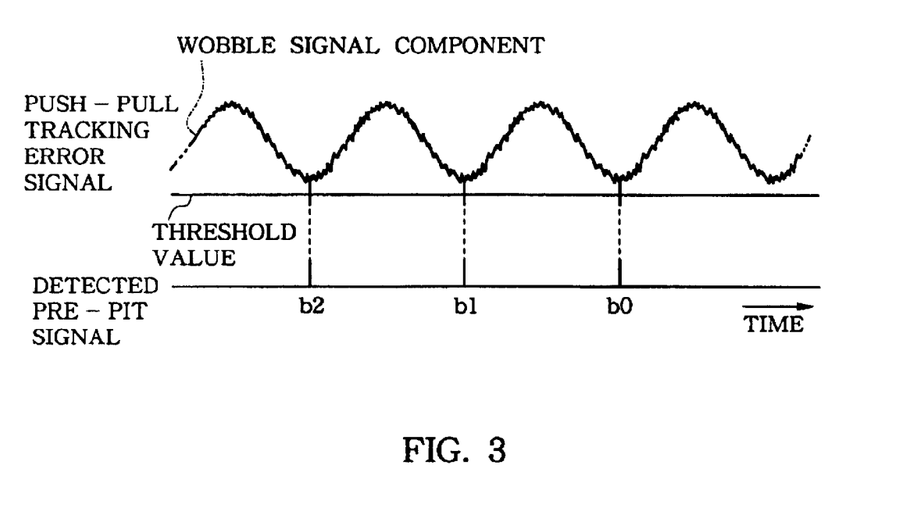
FIG. 3 is a waveform diagram explanatory of a manner in which pre-pits are detected from a push-pull tracking error signal.

During recording or reproduction on the optical disc, pre-pit signal components can be determined as projecting beyond peak points of wobble signal components contained in a push-pull tracking error signal, as shown in FIG. 3. Thus, the pre-pit signal can be detected, for example, by comparing a tracking error signal with an appropriate threshold value, as also shown in FIG. 3. By decoding the thus-detected pre-pit signal, there can be obtained information, such as address information, sync frame synchronization information (b2="1") and sector synchronization information (b2, b1, b0="1, 1, 1" or "1, 1, 0").

As noted earlier, the synchronization bit of the pre-pit code is normally placed in every other track-constituting unit section appearing along the longitudinal direction of the track, it is recorded in a track-constituting unit section immediately following the normal track-constituting unit section in such a region of the track where the synchronization bit in the land track substantially overlap radially with the synchronization bit in an inner adjacent track. Thus, the synchronization bit sometimes occurs in two successive track-constituting unit sections or no synchronization bit sometimes occurs in two successive track-constituting unit sections. As a consequence, when the synchronization bit has been detected in two successive track-constituting unit sections, it is very difficult to determine whether the successive synchronization bits are correctly-detected synchronization bits, or erroneously-detected synchronization bits despite loss of the predetermined synchronization. Similarly, when no synchronization bit has been detected in two successive track-constituting unit sections, it is very difficult to determine whether the non-detection of the synchronization bit is due to the fact that the synchronization bit is just missing from the two successive track-constituting unit sections although the predetermined synchronization has been attained, or due to loss of the predetermined synchronization.

SUMMARY OF THE INVENTION

In view of the foregoing, it is an object of the present invention to provide a method capable of identifying, with high accuracy, erroneous detection of a pre-pit synchronization bit at the time of detecting pre-pit signals from readout signals of an optical disc having formed therein pre-pits in a given signal format, and a method capable of identifying, with high accuracy, stability/instability of pre-pit synchronization bit detection by use of the erroneous detection identifying method and an identified result of the erroneous detection identifying method. It is another object of the present invention to provide electric circuits suitable for implementing the above-mentioned methods of the present invention.

An optical disc has been known on which synchronization bits are recorded as pre-pits, at predetermined locations of a track, in every other one of a plurality of successive track-constituting unit sections provided along a longitudinal direction of the track and on which in each region of the track where the synchronization bit substantially overlaps with the synchronization bit of an adjacent track in a radial direction of the optical disc, a recorded location of the synchronization bit is displaced, in the longitudinal direction of the track, by one track-constituting unit section 1. In this type of optical disc, the region, where the recorded location of the synchronization bit is displaced by one track-constituting unit section, does not occur so frequently. Thus, the present invention is arranged to identify erroneous detection of a pre-pit synchronization bit, using such a characteristic of the optical disc.

Namely, at the time of detecting a pre-pit synchronization bit from a readout signal of the optical disc, the erroneous detection identifying method of the present invention performs: a step of detecting presence/absence of the synchronization bit at the predetermined location in each of the track-constituting unit sections; a step of, when the synchronization bit is detected or not detected in two or more successive track-constituting unit sections and then the synchronization bit is detected or not detected in following two successive track-constituting unit sections within a predetermined time, determining that detection or non-detection of the synchronization bit in the following two successive track-constituting unit sections is erroneous; and a step of, when the synchronization bit is detected only in every other track-constituting unit section within the predetermined time period and then the synchronization bit is detected in two successive track-constituting unit sections following the predetermined time period or when the synchronization bit is detected only in every other track-constituting unit section within the predetermined time period and then the synchronization bit is not detected in the two successive track-constituting unit sections following the predetermined time period, determining that detection or non-detection of the synchronization bit in the two successive track-constituting unit sections following the predetermined time period is accurate or has no error.

Thus, when the synchronization bit has been detected in two successive track-constituting unit sections, the present invention can appropriately determine whether the successive synchronization bits are correctly-detected synchronization bits, or erroneously-detected synchronization bits despite loss of the predetermined synchronization. Similarly, when the synchronization bit has not been detected in two successive track-constituting unit sections, the present invention can appropriately determine whether the non-detection of the synchronization bit is due to the fact that the synchronization bit is just missing from the two successive track-constituting unit sections although the predetermined synchronization has been achieved, or due to loss of the predetermined synchronization. With this arrangement, erroneous detection of the synchronization bit can be identified with high accuracy. In addition to the above-mentioned determination steps, the present invention may further comprise a determination step of, when the synchronization bit is detected in every other track-constituting unit sections, determining that detection or non-detection of the synchronization bit is accurate or has no error, but when the synchronization bit is detected or not detected in three or more successive track-constituting unit sections, determining that detection or non-detection of the synchronization bit in the three or more successive track-constituting unit sections is erroneous or has an error.

According to another aspect of the present invention, there is provided a method for identifying stability/instability of pre-pit synchronization bit detection from an optical disc, which comprises: a step of, on the basis of a determination result by the above-mentioned erroneous detection identifying method, determining present/absence of erroneous detection of a pre-pit synchronization bit in each of optionally-set time periods; a step of updating a count value by a predetermined amount in one counting direction each time no erroneous detection of the pre-pit synchronization bit is made in one of the time periods, but updating the count value by a predetermined amount in another counting direction each time erroneous detection of the pre-pit synchronization bit is made in one of the time periods; and a step of, when the count value has reached a predetermined value in the one counting direction, determining that the detection of the pre-pit synchronization bit is in a stable state, but when the count value has reached a predetermined value in the other counting direction, determining that the detection of the pre-pit synchronization bit is in an instable state.

Because the erroneous detection of the synchronization bit can be identified with high accuracy by the above-mentioned erroneous detection identifying method of the invention, the method for identifying stability/instability of pre-pit synchronization bit detection, using the erroneous detection identifying method, can also identify the stability/instability of pre-pit synchronization bit detection with high accuracy. Further, servo gains for tracking and focus control of the optical pickup and the like can be changed using an identified result of the stability/instability identification; for example, the servo gains may be increased when the detection of the pre-pit synchronization bit is determined as stable, and the servo gains may be decreased when the detection of the pre-pit synchronization bit is determined as instable. Furthermore, spindle motor control can be changed using the identified result of the stability/instability identification; for example, frequency control of the spindle motor may be employed when the detection of the pre-pit synchronization bit is determined as stable, and phase control of the spindle motor may be employed when the detection of the pre-pit synchronization bit is determined as instable.

According to still another embodiment of the present invention, there is provided a circuit for identifying erroneous detection of a pre-pit synchronization bit from a readout signal of an optical disc, which comprises: a timing generator section for instructing arrival timing of the synchronization bit for each of the track-constituting unit sections; a synchronization bit detector section for detecting presence/absence of the synchronization bit at the arrival timing instructed by the timing generator section; a storage section for storing data indicative of the presence/absence of the synchronization bit detected via the synchronization bit detector section for each of the track-constituting unit sections; and a decoder section for decoding stored data of the storage section for each of the track-constituting unit sections. When the synchronization bit is detected only in every other one of the track-constituting unit sections, the decoder section determines that detection of the synchronization bit in the plurality of track-constituting unit sections is accurate. When the synchronization bit is detected in two successive track-constituting unit sections only once but detected only in every other one of the track-constituting unit sections on other occasions, or when the synchronization bit is not detected in two successive track-constituting unit sections only once but detected only in every other one of the track-constituting unit sections on other occasions, the decoder section determines that the detection of the synchronization bit in the plurality of track-constituting unit sections is accurate, provided that the synchronization bit has been detected only in every other track-constituting unit section in a preceding predetermined time period. Further, when the synchronization bit has been detected or not detected in two or more successive track-constituting unit sections in the preceding predetermined time period, the decoder section determines that the detection of the synchronization bit in the plurality of track-constituting unit sections is erroneous. Furthermore, when the synchronization bit is detected or not detected in two successive track-constituting unit sections more than once, the decoder section determines that the detection of the synchronization bit in the plurality of track-constituting unit sections is erroneous. Moreover, when the synchronization bit is detected or not detected in three or more successive track-constituting unit sections, the decoder section determines that the detection of the synchronization bit in the plurality of track-constituting unit sections is erroneous.

According to still another embodiment of the present invention, there is provided a circuit for identifying stability/instability of pre-pit synchronization bit detection from an optical disc, which comprises: a counter for, on the basis of a determination output of the above-mentioned circuit for identifying erroneous detection of a pre-pit synchronization, updating a count value by a predetermined amount in one counting direction each time it has been determined that the detection of the pre-pit synchronization bit in one of the track-constituting unit sections is accurate, but updating the count value by a predetermined amount in another counting direction each time it has been determined that the detection of the pre-pit synchronization bit in one of the track-constituting unit sections is erroneous; and a determination section for, when the count value of the counter has reached a predetermined value in the one counting direction, determining that the detection of the pre-pit synchronization bit is in a stable state, but when the count value has reached a predetermined value in the other counting direction, determining that the detection of the pre-pit synchronization bit is in an instable state.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION OF THE PREFERRED EMBODIMENTS

Figure 1:
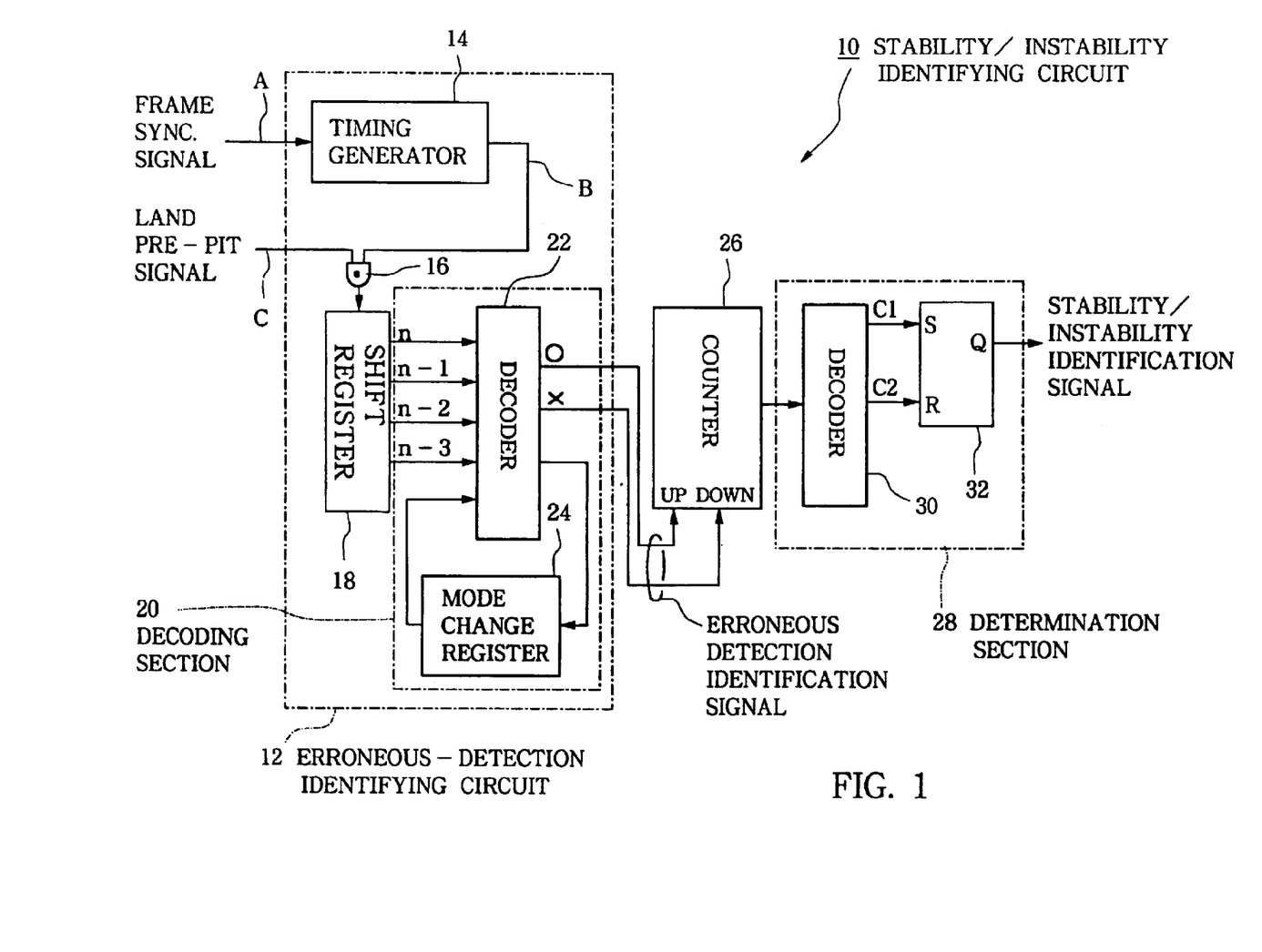
FIG. 1 is a block diagram showing an electric circuit for identifying erroneous detection of a pre-pit synchronization bit and an electric circuit for identifying stability/instability of pre-pit synchronization bit detection.

Now, embodiments of the present invention will be described in relation to a case where the basic principles of the invention are applied to an optical disc apparatus handling a DVD-R disc to record or reproduce desired information to or from the DVD-R disc. In FIG. 1, there are shown an erroneous-detection identifying circuit for identifying erroneous detection of a pre-pit synchronization bit and a stability/instability identifying circuit for identifying stability/instability of pre-pit synchronization bit detection. Specifically, the stability/instability identifying circuit 10 includes the erroneous-detection identifying circuit 12. Signals A to C output from various components of the erroneous-detection identifying circuit 12 are shown in detail in FIG. 4 using the same reference characters A to C. The erroneous-detection identifying circuit 12 includes a timing generator 14 that signals timing when a synchronization bit b2 should arrive for each track-constituting unit section (sync frame in this case). To the timing generator 14 is input a frame synchronization signal (signal A in FIG. 4) from a land pre-pit decoder (not shown) or the like. The frame synchronization signal is generated at normal timing when the head location of each sync frame should arrive; in this case, the normal timing when the head location of each sync frame should arrive is predicted on the basis of a time point when a land pre-pit synchronization signal b2 is detected by the land pre-pit decoder (not shown) from a readout signal of the DVD–R disc. Note that the detection of the land pre-pit synchronization signal is possible even before the rotation of the optical disc becomes stable. More specifically, the timing generator 14 generates a timing signal of a predetermined width or duration (signal B in FIG. 4) in synchronism with the input frame synchronization signal A. This timing signal B is a signal having some margin (window width) before and after the arrival timing of the synchronization bit b2.

Figure 4:
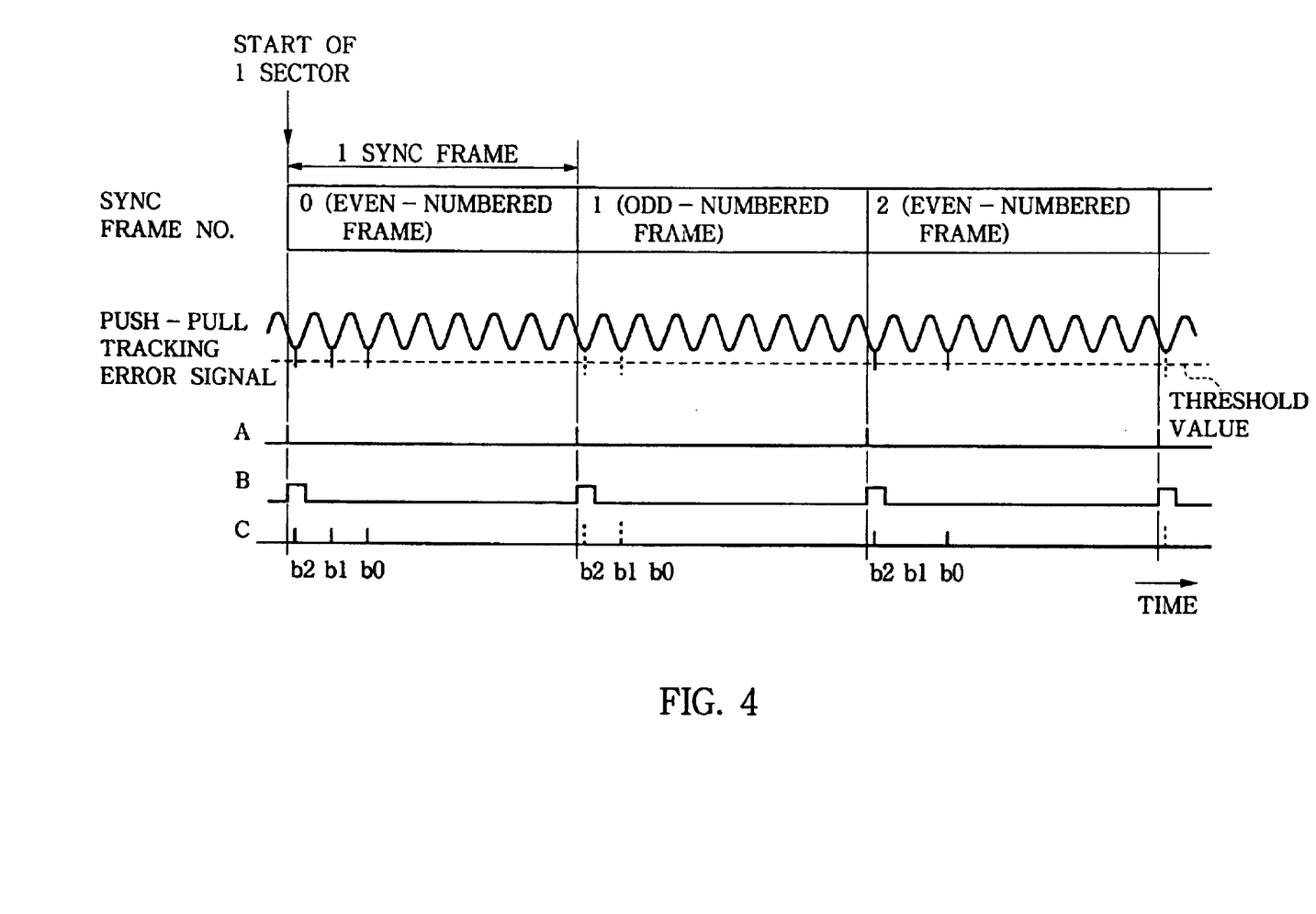
FIG. 4 is a diagram showing waveforms of a push-pull tracking error signal and signals denoted at A to C of FIG. 1.

Further, in the erroneous-detection identifying circuit 12, an AND circuit 16 is supplied with a land pre-pit signal decoded by the land pre-pit decoder (i.e., signal C obtained by comparing a push-pull tracking error signal of FIG. 4 with an appropriate threshold signal) and the above-mentioned timing signal B, in order to detect the synchronization bit b2 of the land pre-pit signal C input within a section corresponding to the timing signal B. Each output from the AND circuit 16 is given to a serial input/parallel output shift register 18 of the erroneous-detection identifying circuit 12. The shift register 18 is composed of registers corresponding to four sync frames and sequentially shifts the output from the AND circuit 16 (i.e., value "1" for each sync frame where the synchronization bit b2 has been detected and value "0" for each sync frame where the synchronization bit b2 has not been detected) with the same cycle as the sync frame.

Four-bit parallel output of the shift register 18 is coupled to a decoding section 20, which includes a decoder 22 and a mode change register 24. The decoding section 20 decodes the four-bit parallel output of the shift register 18 for every four sync frames from the start of each sector, and determines whether or not there has occurred an error in synchronization bit detection within the four sync frames. Criteria used here for determination of the synchronization bit detection error are as follows.

(a) When the synchronization bit b2 has been detected only in every other sync frame within the current four-sync-frame set, it is determined that the synchronization bit detection "has no error" or "accurate".

(b) When the synchronization bit b2 has been detected in two successive sync frames within the current four-sync-frame set, or when no synchronization bit b2 has been detected in two successive sync frames within the current four-sync-frame set, any one of the following determinations is made depending on detection results of the synchronization bit b2 in a four-sync-frame set immediately preceding the current four-sync-frame set in question.

(b-1) If the synchronization bit b2 has been detected only in every other sync frame within the preceding four-sync-frame set, the synchronization bit detection is determined as "having no error" or "or accurate" assuming that there has occurred an odd/even mode change (for switching the pre-pit recording location between the even-numbered frame and the odd-numbered frame) in the current four-sync-frame set.

(b-2) If the synchronization bit b2 has been detected in two successive sync frames within the preceding four-sync-frame set, or If no synchronization bit b2 has been detected in two successive sync frames within the preceding four-sync-frame set, the synchronization bit detection is determined as "having an error" or "erroneous" because the odd/even mode change basically does not take place so often. Similarly, if the synchronization bit b2 has been detected in three successive sync frames within the preceding four-sync-frame set, or If no synchronization bit b2 has been detected in three successive sync frames within the preceding four-sync-frame set, the synchronization bit detection can be determined as "having an error".

(c) When the synchronization bit b2 has been detected successively in first two sync frames within the current four-sync-frame set and no synchronization bit b2 has been detected in next two successive sync frames within the current four-sync-frame set, or when no synchronization bit b2 has been detected in the first two successive sync frames within the current four-sync-frame set and the synchronization bit b2 has been detected in the next two successive sync frames within the current four-sync-frame set, the synchronization bit detection is determined as "having an error" because these detection patterns are basically unlikely.

(d) When the synchronization bit b2 has been detected in three or more successive sync frames within the current four-sync-frame set, or when no synchronization bit b2 has been detected in three or more successive sync frames within the current four-sync-frame set, the synchronization bit detection can be determined as "having an error" because these detection pattern are basically unlikely.

The mode change register 24 detects, for each set of four sync frames to be examined, odd/even mode changes within the four sync frames, i.e. that the synchronization bit b2 has been detected in two or more successive sync frames or that no synchronization bit b2 has been detected in two or more successive sync frames. The detected result is held for a time corresponding to next four sync frames and then used by the decoder 22 to identify an error in synchronization bit detection for the next four sync frames. Examples of the determination by the decoder 22 are shown in TABLE 2. In TABLE 2, "CHGMD" represents a detected result of the odd/even mode change in the immediately preceding four-sync-frame set which is held in the mode change register 24. That is, CHGMD "0" indicates that the synchronization bit b2 has occurred alternately (i.e., in every other sync frame within the immediately preceding four-sync-frame set (i.e., "0101" or "1010"), namely, that no change has been made to the odd/even mode. CHGMD "1", on the other hand, indicates another detected result that the synchronization bit b2 has been detected in two or more successive sync frames within the immediately preceding four-sync-frame set or no synchronization bit b2 has been detected in two or more successive sync frames within the immediately preceding four-sync-frame set, namely, that a change has been made to the odd/even mode. Further, in Table 2, "determination result ○" indicates that the synchronization bit detection has no error or accurate, and "determination result x" indicates that the synchronization bit detection has an error or erroneous. Further, "NEXT CHGMD" in TABLE 2 represents a detected result of the odd/even mode change which is held in the mode change register 24 on the basis of the four-bit parallel output of the shift register 18 and which is used for identification of the erroneous synchronization bit detection in the next four-sync-frame set.

TABLE 2

| Pattern No. | 4-BIT OUTPUT OF SHIFT REGISTER 18 | | | | CHGMD | DETERMINATION RESULT | NEXT CHGMD |
|---|---|---|---|---|---|---|---|
| | n−3 | n−2 | n−1 | n | | | |
| 1 | 0 | 0 | 0 | 0 | 0 or 1 | X | 1 |
| 2 | 0 | 0 | 0 | 1 | 0 or 1 | X | 1 |
| 3 | 0 | 0 | 1 | 0 | 0 | ○ | 1 |
| 4 | | | | | 1 | X | 1 |
| 5 | 0 | 0 | 1 | 1 | 0 or 1 | X | 1 |
| 6 | 0 | 1 | 0 | 0 | 0 | ○ | 1 |
| 7 | | | | | 1 | X | 1 |
| 8 | 0 | 1 | 0 | 1 | 0 or 1 | ○ | 0 |
| 9 | 0 | 1 | 1 | 0 | 0 | ○ | 1 |
| 10 | | | | | 1 | X | 1 |
| 11 | 0 | 1 | 1 | 1 | 0 or 1 | X | 1 |
| 12 | 1 | 0 | 0 | 0 | 0 or 1 | X | 1 |
| 13 | 1 | 0 | 0 | 1 | 0 | ○ | 1 |
| 14 | | | | | 1 | X | 1 |
| 15 | 1 | 0 | 1 | 0 | 0 or 1 | ○ | 0 |
| 16 | 1 | 0 | 1 | 1 | 0 | ○ | 1 |
| 17 | | | | | 1 | X | 1 |
| 18 | 1 | 1 | 0 | 0 | 0 or 1 | X | 1 |
| 19 | 1 | 1 | 0 | 1 | 0 | ○ | 1 |
| 20 | | | | | 1 | X | 1 |
| 21 | 1 | 1 | 1 | 0 | 0 or 1 | X | 1 |
| 22 | 1 | 1 | 1 | 1 | 0 or 1 | X | 1 |

In the case of pattern Nos. 3, 6 and 9 of TABLE 2, the next four sync frames should always take the No. 15 pattern, and thus the decoder 22 can yield "determination result ○" (indicating that the detection has no error) only when the No. 15 pattern has been detected in the next four sync frames. Similarly, in the case of pattern Nos. 13, 16 and 19, the next four sync frames should always take the No. 8 pattern, and thus the decoder 22 can yield "determination result ○" only when the No. 8 pattern has been detected in the next four sync frames. Further, although no consideration has been given, in the above examples, to an odd/even mode change immediately before and after the demarcation point between adjacent sets of the four sync frames (i.e., odd/even mode change between the last sync frame of preceding four sync frames and the leading or first sync frame of succeeding four sync frames), the decoder 22 can also detect an odd/even mode change immediately before and after the demarcation point between adjacent sets of the four sync frames; namely, in this case, the decoder 22 identifies an odd/even mode change when the synchronization bit b2 has been detected successively in the last sync frame of the preceding four sync frames and in the leading sync frame of the succeeding four sync frames or when no synchronization bit b2 has been detected successively in the last sync frame of the preceding four sync frames and in the leading sync frame of the succeeding four sync frames. This way, the decoder 20 can also identify an odd/even mode change within the four sync frames in addition to any error in the synchronization bit detection.

The decoder 20 has been described above as yielding "determination result x" when an odd/even mode change has been detected on condition that the following sync frames have presented any other pattern than the No. 8 or No. 15 pattern. In an alternative, a given time period (e.g., a time period longer than a total time length of four sync frames) may be set by a timer or the like, and the decoder 20 may yield "determination result x" when an odd/even mode change has been detected within the time period on condition that the following sync frames have presented any other pattern than the No. 8 or No. 15 pattern. Further, whereas the decoder 20 has been described above as performing the operation for identifying a synchronization bit detection error every four sync frames, the synchronization bit detection error may be identified for every other number of sync frames than four. In another alternative, the operation for identifying a synchronization bit detection error may be carried out without demarcating the sector as mentioned above; for example, the synchronization bit detection may be determined as "having an error" if a time length from a time point of successive occurrence of the synchronization bit detection value "0" or "1" to a time point of next successive occurrence of the synchronization bit detection value "0" or "1" is shorter than a predetermined value.

Referring back to FIG. 1, the stability/instability identifying circuit 10 also includes a counter 26 in the form of an up/down counter, which is reset to an initial value of "0" in response to an instruction for starting up rotation of the disc (e.g., reproduction or recording start instruction). The count of the counter 26 thus rest is incremented by one each time the erroneous-detection identifying circuit 12 outputs "determination result ○" indicating that the synchronization bit detection has no error, but is decremented by one each time the erroneous-detection identifying circuit 12 outputs "determination result x" indicating that the synchronization bit detection has an error.

Further, the stability/instability identifying circuit 10 includes a determination section 28 for determining whether the synchronization bit detection has been performed in a stable condition or in an instable condition. Namely, in the determination section 28, a higher count value C1 for determining that the synchronization bit detection has been shifted from the instable condition to the stable condition and a lower count value C2 for determining that the synchronization bit detection has been shifted from the stable condition to the instable condition are set into a decoder 30. In this case, C1>C2; for example, C1=16 and C2=0. Once the count of the counter 26 has increased to reach the higher count value C1 with an RS flip-flop circuit 32 kept in a reset state, the decoder 30 sets the RS flip-flop circuit 32. When the count of the counter 26 has decreased to reach the lower count value C2 with the RS flip-flop circuit 32 kept in a set state, the decoder 30 resets the RS flip-flop circuit 32. Q output terminal of the RS flip-flop circuit 32 outputs a logical value "1" or "0" as a signal indicative of stable synchronization signal detection or instable synchronization signal detection. The stable synchronization signal detection signal ("1") or instable synchronization signal detection signal ("0") will be used in switching a servo gain, spindle motor control, etc.

Whereas the preferred embodiment has been described above only in relation to the case where the present invention is applied to recording or reproduction to or from a DVD–R disc, the present invention is also applicable to recording or reproduction on any other optical discs having pre-pits formed therein in such a manner that synchronization bits are placed at predetermined locations along the length of tracks in every other track-constituting unit section appearing in the lengthwise or longitudinal direction of the track and that in each region of the track where the synchronization bit overlaps or substantially overlaps with the synchronization bit of an adjacent track in the radial direction of the optical disc, the recorded position of the synchronization bit in one of the two adjacent tracks is displaced by one track-constituting unit section in the lengthwise direction of the track (i.e. displaced into the immediately following track-constituting unit section).

What is claimed is:

1. A method for identifying erroneous detection of a pre-pit synchronization bit from a readout signal of an optical disc on which synchronization bits are recorded as pre-pits, at predetermined locations of a track, in every other one of a plurality of successive track-constituting unit sections provided along a longitudinal direction of the track and on which in each region of the track where the synchronization bit substantially overlaps with the synchronization bit of an adjacent track in a radial direction of the optical disc, a recorded location of the synchronization bit is displaced, in the longitudinal direction of the track, by one track-constituting unit section, said method comprising:

a step of detecting presence/absence of the synchronization bit at the predetermined location in each of the track-constituting unit sections;

a step of, when the synchronization bit is detected or not detected in two or more successive track-constituting unit sections and then the synchronization bit is detected or not detected in following two successive track-constituting unit sections within a predetermined time, determining that detection or non-detection of the synchronization bit in said following two successive track-constituting unit sections is erroneous; and a step of, when the synchronization bit is detected only in every other track-constituting unit section within the predetermined time period and then the synchronization bit is detected in two successive track-constituting unit sections following the predetermined time period or when the synchronization bit is detected only in every other track-constituting unit section within the predetermined time period and then the synchronization bit is not detected in the two successive track-constituting unit sections following the predetermined time period, determining that detection or non-detection of the synchronization bit in the two successive track-constituting unit sections following the predetermined time period is accurate.

2. A method as claimed in claim 1 wherein when the synchronization bit is detected in every other track-constituting unit sections, it is determined that detection or non-detection of the synchronization bit is accurate, but when the synchronization bit is detected or not detected in three or more successive track-constituting unit sections, it is determined that detection or non-detection of the synchronization bit in the three or more successive track-constituting unit sections is erroneous.

3. A method for identifying stability/instability of pre-pit synchronization bit detection from an optical disc said method comprising:

a step of, on the basis of a determination result by said method for identifying erroneous detection of a pre-pit synchronization bit as claimed in claim 2, determining present/absence of erroneous detection of a pre-pit synchronization bit in each of optionally-set time periods;

a step of updating a count value by a predetermined amount in one counting direction each time no erroneous detection of the pre-pit synchronization bit is made in one of the time periods, but updating the count value by a predetermined amount in another counting direction each time erroneous detection of the pre-pit synchronization bit is made in one of the time periods; and a step of, when the count value has reached a predetermined value in the one counting direction, determining that the detection of the pre-pit synchronization bit is in a stable state, but when the count value has reached a predetermined value in the other counting direction, determining that the detection of the pre-pit synchronization bit is in an instable state.

4. A circuit for identifying erroneous detection of a pre-pit synchronization bit from a readout signal of an optical disc on which synchronization bits are recorded as pre-pits, at predetermined locations of a track, in every other one of a plurality of successive track-constituting unit sections provided along a longitudinal direction of the track and on which in each region of the track where the synchronization bit substantially overlaps with the synchronization bit of an adjacent track in a radial direction of the optical disc, a recorded location of the synchronization bit is displaced, in the longitudinal direction of the track, by one track-constituting unit section, said circuit comprising:

a timing generator section for instructing arrival timing of the synchronization bit for each of the track-constituting unit sections;

a synchronization bit detector section for detecting presence/absence of the synchronization bit at the arrival timing instructed by said timing generator section;

a storage section for storing data indicative of the presence/absence of the synchronization bit detected via said synchronization bit detector section for each of the track-constituting unit sections; and a decoder section for decoding stored data of said storage section for each of the track-constituting unit sections so that:

when the synchronization bit is detected only in every other one of the track-constituting unit sections, said decoder section determines that detection of the synchronization bit in the plurality of track-constituting unit sections is accurate;

when the synchronization bit is detected in two successive track-constituting unit sections only once but detected only in every other one of the track-constituting unit sections on other occasions, or when the synchronization bit is not detected in two successive track-constituting unit sections only once but detected only in every other one of the track-constituting unit sections on other occasions, said decoder section determines that the detection of the synchronization bit in the plurality of track-constituting unit sections is accurate, provided that the synchronization bit has been detected only in every other track-constituting unit section in a preceding predetermined time period;

when the synchronization bit has been detected or not detected in two or more successive track-constituting unit sections in the preceding predetermined time period, said decoder section determines that the detection of the synchronization bit in the plurality of track-constituting unit sections is erroneous;

when the synchronization bit is detected or not detected in two successive track-constituting unit sections more than once, said decoder section determines that the detection of the synchronization bit in the plurality of track-constituting unit sections is erroneous; and when the synchronization bit is detected or not detected in three or more successive track-constituting unit sections, said decoder section determines that the detection of the synchronization bit in the plurality of track-constituting unit sections is erroneous.

5. A circuit for identifying stability/instability of pre-pit synchronization bit detection from an optical disc said circuit comprising:

a counter for, on the basis of a determination output of said circuit for identifying erroneous detection of a pre-pit synchronization bit as claimed in claim 4, updating a count value by a predetermined amount in one counting direction each time it has been determined that the detection of the pre-pit synchronization bit in one of the track-constituting unit sections is accurate, but updating the count value by a predetermined amount in another counting direction each time it has been determined that the detection of the pre-pit synchronization bit in one of the track-constituting unit sections is erroneous; and a determination section for, when the count value of said counter has reached a predetermined value in the one counting direction, determining that the detection of the pre-pit synchronization bit is in a stable state, but when the count value has reached a predetermined value in the other counting direction, determining that the detection of the pre-pit synchronization bit is in an instable state.

6. A circuit for identifying erroneous detection of a pre-pit synchronization bit from a readout signal of an optical disc on which synchronization bits are recorded as pre-pits, at predetermined locations of a track, in every other one of a plurality of successive track-constituting unit sections provided along a longitudinal direction of the track and on which in each region of the track where the synchronization bit substantially overlaps with the synchronization bit of an adjacent track in a radial direction of the optical disc, a recorded location of the synchronization bit is displaced, in the longitudinal direction of the track, by one track-constituting unit means, said circuit comprising:

timing generator means for instructing arrival timing of the synchronization bit for each of the track-constituting unit sections;

synchronization bit detector means for detecting presence/absence of the synchronization bit at the arrival timing instructed by said timing generator means;

storage means for storing data indicative of the presence/absence of the synchronization bit detected via said synchronization bit detector means for each of the track-constituting unit means; and decoder means for decoding stored data of said storage section for each of the track-constituting unit means so that:

when the synchronization bit is detected only in every other one of the track-constituting unit means, said decoder means determines that detection of the synchronization bit in the plurality of track-constituting unit means is accurate;

when the synchronization bit is detected in two successive track-constituting unit means only once but detected only in every other one of the track-constituting unit means on other occasions, or when the synchronization bit is not detected in two successive track-constituting unit means only once but detected only in every other one of the track-constituting unit means on other occasions, said decoder means determines that the detection of the synchronization bit in the plurality of track-constituting unit means is accurate, provided that the synchronization bit has been detected only in every other track-constituting unit means in a preceding predetermined time period;

when the synchronization bit has been detected or not detected in two or more successive track-constituting unit means in the preceding predetermined time period, said decoder means determines that the detection of the synchronization bit in the plurality of track-constituting unit means is erroneous;

when the synchronization bit is detected or not detected in two successive track-constituting unit means more than once, said decoder means determines that the detection of the synchronization bit in the plurality of track-constituting unit means is erroneous; and when the synchronization bit is detected or not detected in three or more successive track-constituting unit means, said decoder means determines that the detection of the synchronization bit in the plurality of track-constituting unit means is erroneous.

7. A circuit for identifying stability/instability of pre-pit synchronization bit detection from an optical disc said circuit comprising:

counter means for, on the basis of a determination output of said circuit for identifying erroneous detection of a pre-pit synchronization bit as claimed in claim 4, updating a count value by a predetermined amount in one counting direction each time it has been determined that the detection of the pre-pit synchronization bit in one of the track-constituting unit means is accurate, but updating the count value by a predetermined amount in another counting direction each time it has been determined that the detection of the pre-pit synchronization bit in one of the track-constituting unit means is erroneous; and determination means for, when the count value of said counter has reached a predetermined value in the one counting direction, determining that the detection of the pre-pit synchronization bit is in a stable state, but when the count value has reached a predetermined value in the other counting direction, determining that the detection of the pre-pit synchronization bit is in an instable state.

* * * * *